(12) United States Patent
Suzuki et al.

(10) Patent No.: US 7,854,525 B2
(45) Date of Patent: Dec. 21, 2010

(54) LIGHT REFLECTOR AND PLANAR LIGHT SOURCE

(75) Inventors: Osamu Suzuki, Tokyo (JP); Nobuyuki Morita, Tokyo (JP); Kouji Masuda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 207 days.

(21) Appl. No.: 12/089,012

(22) PCT Filed: Oct. 2, 2006

(86) PCT No.: PCT/JP2006/319688

§ 371 (c)(1),
(2), (4) Date: Jun. 20, 2008

(87) PCT Pub. No.: WO2007/040198

PCT Pub. Date: Apr. 12, 2007

(65) Prior Publication Data

US 2009/0231842 A1    Sep. 17, 2009

(30) Foreign Application Priority Data

Oct. 4, 2005    (JP) .............................. 2005-291077

(51) Int. Cl.
*G09F 13/04* (2006.01)
*G09F 13/08* (2006.01)

(52) U.S. Cl. .................. 362/97.2; 362/217.05; 349/64; 349/67

(58) Field of Classification Search ................ 362/97.1, 362/97.2, 217.05; 349/64, 67
See application file for complete search history.

(56) References Cited

U.S. PATENT DOCUMENTS 5,844,731 A * 12/1998 Kabumoto et al. .......... 359/869
2006/0132672 A1 * 6/2006 Shih et al. .................... 349/64

FOREIGN PATENT DOCUMENTS

| JP | 62 131403 | 6/1987 |
| JP | 4 4504 | 1/1992 |
| JP | 6 302209 | 10/1994 |
| JP | 2002 221613 | 8/2002 |
| JP | 2003 15126 | 1/2003 |
| JP | 2003 21726 | 1/2003 |
| JP | 2004 138715 | 5/2004 |
| WO | 01 35129 | 5/2001 |

* cited by examiner

*Primary Examiner*—Jason Moon Han
(74) *Attorney, Agent, or Firm*—Oblon, Spivak, McClelland, Maier & Neustadt, L.L.P.

(57) ABSTRACT

A light reflector and a planar light source achieving high average luminance and little luminance unevenness are provided. In a light reflector including a reflector and a reflective chevronwise partition plate projecting in a shape of a chevron from the reflector, a reflective planar partition plate is provided, connected to a peak section of the chevronwise partition plate such as to project upwards from the peak section. The chevronwise partition plate and the planar partition plate are disposed between adjacent linear light sources.

3 Claims, 1 Drawing Sheet

LIGHT REFLECTOR AND PLANAR LIGHT SOURCE

TECHNICAL FIELD

The present invention relates to a light reflector and a planar light source used, for example, in a backlight of a liquid crystal display device or in an illuminated signboard.

BACKGROUND ART

Conventionally, as a planar light source used in a backlight of a liquid crystal display device, in an illuminated signboard, or the like, there is a planar light source using a three-dimensional light reflector made from synthetic resin. As a light reflector such as this, for example, a light reflector formed as follows is proposed (refer to, for example, Patent Literature 1). In the light reflector, a linear bending line that is a perforated line, a pressed ruled line, a half-cut, or the like is formed on a foamed plastic film or sheet that reflects light, and a chevronwise section is formed by the film or sheet being bent along the bending line.

Patent Literature 1: Japanese Patent Laid-open Publication No. 2004-138715

DISCLOSURE OF INVENTION

Problem to be Solved by the Invention

The light reflector described in Patent Literature 1 can effectively control a directionality of a reflected light, compared to a planar light reflector. Therefore, luminance distribution can be improved. However, in the light reflector in Patent Literature 1, when a light source pitch is narrow, freedom of design regarding a shape of a chevron section (chevron height and vertex angle) decreases. Advantageous effects of the chevron section may not be sufficiently achieved.

Specifically, in the light reflector in Patent Literature 1, the height of the chevron section is required to be increased to enhance average luminance. However, when the height of the chevron section is increased, the reflected light at a foot portion of the chevron section is front-projected to the light source and is not directly front-projected to a surface in front of the chevron section. Therefore, reflected light loss occurs. The average luminance is not improved and luminance unevenness increases.

The present invention has been achieved in light of the above-described issues. An object of the present invention is to provide a light reflector and a planar light source using the light reflector, in which the light reflector has a chevron section. The light reflector can achieve an average luminance equal to when a height of a chevron section is high, without increasing the height of the chevron section, and can similarly reduce luminance unevenness to that when the height of the chevron section is decreased.

Means for Solving Problem

As a result of keen examination to achieve the above-described object, inventors of the present invention have found that a light reflector and a planar light source having high average luminance and little luminance unevenness can be achieved as follows. When, in a light reflector having a chevron section, a height of the chevron section is set to a low height to prevent an occurrence of reflected light loss at a foot portion of the chevron section and a decrease in average luminosity caused by the reduction in the height of the chevron section height is compensated by a partition plate being further provided on a peak section of the chevron section, an average luminosity that is the same as when the height of the chevron section is high can be achieved and the luminosity unevenness can be reduced to that when the height of the chevron section is low, even when a light source pitch is narrow.

The present invention has been achieved based on the above-described findings. In a light reflector including a reflector and a reflective chevronwise partition plate projecting in a shape of a chevron from the reflector, a reflective planar partition plate is provided, connected to a peak section of the reflective chevronwise partition plate such as to project upwards from the peak section.

In the present invention, in a planar light source in which a plurality of linear light sources are arranged in parallel between a reflector and a diffuser that are disposed in parallel, and a reflective chevronwise partition plate is provided between adjacent linear light sources such as to project in a shape of a chevron from the reflector, a reflective planar partition plate is provided, connected to a peak section of the reflective chevronwise partition plate such as to project upwards from the peak section.

In this case, the planar light source of the present invention preferably meets following conditions (1) and (2) when a vertical distance from the reflector to a peak section of the planar partition plate is T, a vertical distance from the reflector to a center of a linear light source is Q, a vertical distance from the reflector to the diffuser is H, a horizontal distance from the center of the linear light source to a foot section of the chevronwise partition plate is L, a diameter of the linear light source is D, and a foot angle of the chevronwise partition plate is θ. As a result, the average luminosity can be further enhanced and the luminosity unevenness can be further reduced.

$$T \geq (H+Q)/2 - D/2 \tag{1}$$

$$\theta < 90° - \arctan(Q/L) \tag{2}$$

EFFECT OF THE INVENTION

The light reflector and the planar light source of the present invention achieve high average luminance and little luminance unevenness.

Best Mode(s) for Carrying Out the Invention

Figure 1:
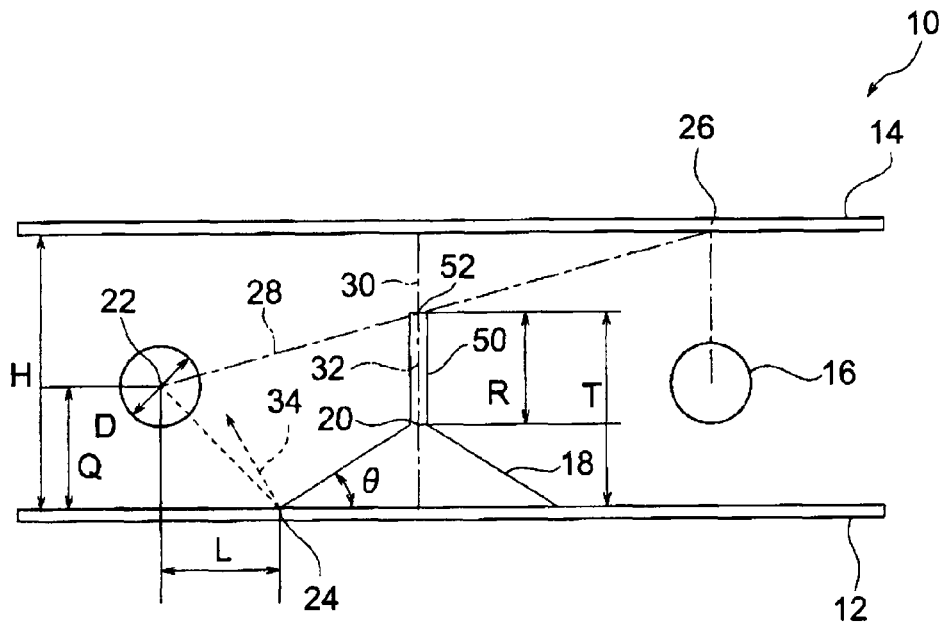
FIG. 1 is a schematic diagram of a light reflector and a planar light source according to an embodiment of the present invention.

An embodiment of the present invention will be described below with reference to the drawings. However, the present invention is not limited to the examples described hereafter. FIG. 1 is a schematic diagram of a light reflector and a planar light source according to the embodiment of the present invention. In a planar light source 10 of the example, a plurality of linear light sources (cold cathode ray tubes) 16 are arranged in parallel and equal distances apart between a reflector 12 and a diffuser 14. The reflector 12 and the diffuser 14 are disposed in parallel. A reflective chevronwise partition plate 18 is provided between adjacent linear light sources 16, such as to project in a shape of a chevron from the reflector 12. A reflective rectangular, planar partition plate 50 is provided, connected to a peak section 20 of the chevronwise partition plate 18 such as to project upwards from the peak section 20. In other words, the light reflector according to the embodiment is configured by the reflector 12, the chevronwise partition plate 18, and the planar partition plate 50. The chevronwise partition plate 18 can be integrally formed with the reflector 12. Alternatively, the chevronwise partition plate 18 can be mechanically joined with the reflector 12 or fixed onto the reflector 12 by an adhesive or the like. The planar partition plate 50 can be integrally formed with the chevronwise partition plate 18. Alternatively, the planar partition plate 50 can be mechanically joined with the chevronwise partition plate 18 or fixed onto the chevronwise partition plate 18 by an adhesive or the like. The planar partition plate 50 can be hollow or solid.

In the planar light source of the present invention, following conditions (1) and (2) are met when a vertical distance from the reflector 12 to a peak section 52 of the planar partition plate 50 is T, a vertical distance from the reflector 12 to a center 22 of a linear light source 16 is Q, a vertical distance from the reflector 12 to the diffuser 14 is H, a horizontal distance from the center 22 of the linear light source 16 to a foot section 24 of the chevronwise partition plate 18 is L, a diameter of the linear light source 16 is D, and a foot angle of the chevronwise partition plate 18 is θ.

$$T \geq (H+Q)/2 - D/2 \qquad (1)$$

$$\theta < 90° - \arctan(Q/L) \qquad (2)$$

Condition (1) indicates that the peak section 52 of the planar partition plate 50 is present at a position that is a position 32 or higher. The position 32 is lower than a position at which a line 28 and a center line 30 intersect by a distance that is equal to a radius of the linear light source 16. The line 28 connects the center 22 of the linear light source 16 and a portion 26 of the diffuser 14 directly above the adjacent linear light source 16. The center line 30 runs between the adjacent linear light sources 16. Condition (2) indicates that a reflected light (mirror reflection element) 34 at the foot section 24 of the chevronwise partition plate 18 is not front-projected outside of the center 22 of the linear light source 16. The reflected light 34 is of light from the linear light source 16.

In the planar light source of the example, height of a reflective chevronwise partition plate and a planar partition plate present between light sources and an angle of the chevronwise partition plate meet the conditions (1) and (2). Therefore, a light emitted from a light source is reflected and diffused by a reflector provided directly below the light source. The light is also effectively reflected and diffused by the chevronwise partition plate. As a result, average luminance is enhanced and luminance unevenness is reduced.

In the present invention, a material used to form the reflector, the reflective chevronwise partition plate, and the reflective planar partition plate is not limited. However, a foamed sheet having a diffuse reflectance of 95% or more is preferably used. More preferably, the material is a thermoplastic film or sheet having fine bubbles or pores with a mean bubble diameter from a length equal to a wavelength of a light to 50 micrometers within. For example, general-purpose resins such as polyethylene, polypropylene, polystyrene, polyvinylchloride, polybiphenylchloride, polyethylene terephthalate and polyvinyl alcohol, engineering plastics such as polycarbonate, polybuthylene terephthalate, polyethylene naphthalate, polyamide, polyacetal, polyphenylene ether, ultra-high molecular weight polyethylene, polysulfone, polyethersulfone, polyphenylenesulfide, polyarlate, polyamideimide, polyetherimide, polyetheretherketone, polyimide, polytetrafluoroethylene, liquid crystal polymer, and fluororesin, or copolymers and mixtures thereof are given as materials for the thermoplastic film or sheet. Among these, polyester such as polyethylene terephthalate and polybuthylene terephthalate, polyphenylenesulfide, polypropylene, and cyclopolyolefin are preferable due to superior heat-resistance and impact-resistance properties and the like. Additives, such as antioxidant, ultraviolet inhibitor, lubricant, pigment, and reinforcement can be added accordingly to the thermoplastic. In addition, a coating layer containing these additives can be applied to and formed on the thermoplastic film or sheet.

More specifically, an example of the foamed sheet is a thermoplastic polyester extrusion sheet that is impregnated with carbon dioxide gas under high pressure and subsequently heated and foamed. A polyester foamed sheet having an internal bubble diameter of 50 micrometers or less (for example, MCPET [registered trademark] manufactured by Furukawa Electric Co., Ltd.) can be used. In addition, a cyclopolyolefin foamed sheet similarly having an internal bubble diameter of 50 micrometers or less can be used.

Another preferred example of the material used to form the reflector, the reflective chevronwise partition plate, and the reflective planar partition plate is a thermoplastic film or sheet containing fillers. A film or sheet in which numerous voids are formed with the fillers serving as cores is given as the example. In this case, the thermoplastic film or sheet containing fillers is preferably a porous stretched film or sheet in which numerous voids are formed with the fillers serving as the cores by forming an un-stretched film or sheet containing fillers and stretching this un-stretched film or sheet.

In the present invention, a thickness of the foamed sheet forming the reflector, the reflective chevronwise partition plate, and the reflective planar partition plate is preferably 200 to 2000 micrometers. When the thickness of the above-described foamed sheet is within a range of 200 to 2000 micrometers, the foamed sheet has rigidity and is therefore a preferable foamed sheet. A specific gravity of the foamed sheet is preferably 0.1 to 0.7. Moreover, the reflector, the reflective chevronwise partition plate, and the reflective planar partition plate can be formed by a metal plate to which the above-described film or sheet is appropriately adhered.

In the present invention, the diffuse reflectance refers to a ratio of a diffuse reflected beam to an incident beam of the light. The diffuse reflectance is measured by a recording spectrophotometer at a wavelength range of 400 to 1200 nanometers. The diffuse reflectance of a white board that is hardened finely-powdered barium sulfate is 100%, and the diffuse reflectance is a value determined as a relative value thereof. For example, UV-3100PC (Shimazu Corporation product name) can be used as the recording spectrophotometer.

In the present invention, straight fluorescent lamps, cold cathode ray tubes, and the like can be used as the linear light source.

EXAMPLE

Next, an example of the planar light source of the present invention will be described. However, the present invention is not limited to the example described hereafter.

Example and Comparative Examples 1 to 3

A planar light source configured as shown in FIG. 1 is manufactured. A planar light source that is the same as the example, aside from the planar partition plate not being provided and the height of the chevronwise partition plate being increased, is manufactured as a comparative example 1. A planar light source that is the same as the example, aside from the planar partition plate not being provided, is manufactured as a comparative example 2. A planar light source that is the same as the example, aside from the chevronwise partition plate and the planar partition plate not being provided, is manufactured as a comparative example 3.

In the example and the comparative examples, a polyethylene terephthalate plastic foam (Furukawa Electric Co., Ltd. product name: MCPET; thickness of 0.8 millimeters, specific gravity of 0.325, and diffuse reflectance of 96.0% at 550 nanometers) having fine bubbles with a mean bubble diameter of 10 micrometers is used for the reflector, the reflective chevronwise partition plate, and the reflective planar partition plate.

Figure 2:
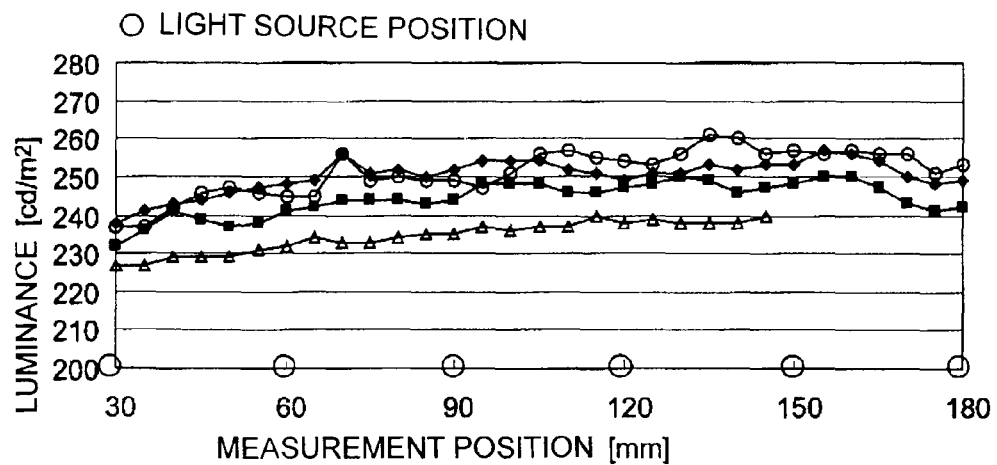
FIG. 2 is a graph showing luminance measurement results for planar light sources of an example and comparative examples.

Next, the planar light sources of the example and the comparative examples are set within a liquid crystal television. Luminance (cd/m$^2$) is measured using a digital luminance meter (BM-9 manufactured by TOPCON Corporation) and a digital luminance meter photodetector (BM-910D by TOPCON Corporation). Results are shown in FIG. 2. It is clear from FIG. 2 that the planar light source of the example has a same average luminance as that of the comparative example 1 in which the height of the chevronwise partition plate is increased and a same luminance unevenness as that of the comparative example 2 in which the height of the chevronwise partition plate is decreased.

The invention claimed is:

1. A planar light source in which a plurality of linear light sources are arranged in parallel between a reflector and a diffuser that are disposed in parallel, and a reflective chevronwise partition plate is provided between adjacent linear light sources such as to project in a shape of a chevron from the reflector, wherein a reflective planar partition plate is provided, connected to a peak section of the reflective chevronwise partition plate such as to project upwards from the peak section, and when a vertical distance from the reflector to a peak section of the planar partition plate is T, a vertical distance from the reflector to a center of a linear light source is Q, a vertical distance from the reflector to the diffuser is H, a horizontal distance from the center of the linear light source to a foot section of the chevronwise partition plate is L, a diameter of the linear light source is D, and a foot angle of the chevronwise partition plate is θ, following conditions (1) and (2) are met:

$$T \geq (H+Q)/2 - D/2 \quad (1)$$

$$\theta < 90° - \arctan(Q/L) \quad (2).$$

2. The planar light source according to claim 1, wherein the reflector, the chevronwise partition plate, and the planar partition plate are formed from a foamed sheet having a diffuse reflectance of 95% or more.

3. The planar light source according to claim 2, wherein the foamed sheet is formed from a thermoplastic having fine bubbles or pores with a mean bubble diameter from a length equal to a wavelength of a light to 50 micrometers within.

* * * * *